(12) United States Patent
Jin

(10) Patent No.: US 9,329,264 B2
(45) Date of Patent: May 3, 2016

(54) SAR IMAGE FORMATION

(71) Applicant: RAYTHEON COMPANY, Waltham, MA (US)

(72) Inventor: Michael Y. Jin, San Gabriel, CA (US)

(73) Assignee: Raytheon Company, Waltham, MA (US)

(*) Notice: Subject to any disclaimer, the term of this patent is extended or adjusted under 35 U.S.C. 154(b) by 206 days.

(21) Appl. No.: 13/768,046

(22) Filed: Feb. 15, 2013

(65) Prior Publication Data

US 2014/0232590 A1   Aug. 21, 2014

(51) Int. Cl.
*G01S 13/90* (2006.01)
*G01S 13/524* (2006.01)
*G01S 13/00* (2006.01)
*G01S 7/288* (2006.01)

(52) U.S. Cl.
CPC .......... *G01S 13/9035* (2013.01); *G01S 13/5242* (2013.01); *G01S 13/90* (2013.01); *G01S 2007/2883* (2013.01); *G01S 2007/2886* (2013.01)

(58) Field of Classification Search
CPC .......... G01S 13/02; G01S 13/50; G01S 13/52; G01S 13/522; G01S 13/524; G01S 13/5242; G01S 13/88; G01S 13/89; G01S 13/90; G01S 13/9035; G01S 7/02; G01S 7/28; G01S 7/285; G01S 7/288; G01S 2007/2883; G01S 2007/2886
USPC ...... 342/25 R–25 F, 175, 176, 179, 192–197, 342/159–164
See application file for complete search history.

(56) References Cited

U.S. PATENT DOCUMENTS 4,034,370 A * 7/1977 Mims .......................... 342/25 D 4,786,906 A * 11/1988 Krogager ..................... 342/25 F
(Continued)

FOREIGN PATENT DOCUMENTS

EP       1 367 409 B1    12/2003

OTHER PUBLICATIONS

Lundgren et al.; "Implementing SAR Image Processing Using Backprojection on the Cell Broadband Engine"; 2008 Radar Conference—IEEE; Rome, Italy; May 26-30, 2008; 6 pages.
Perry et al.; "SAR Imaging of Moving Targets"; IEEE Transactions on Aerospace and Electronic Systems; vol. 35, No. 1, pp. 188-200 (Jan. 1999).

(Continued)

*Primary Examiner* — Bernarr Gregory
(74) *Attorney, Agent, or Firm* — Burns & Levinson LLP; Joseph M. Maraia

(57) ABSTRACT

SAR imaging method that includes applying PRF decimation to range-compressed IQ data to generate PRF-decimated range-compressed IQ data for each image block of an image and applying motion compensation to the PRF-decimated range-compressed IQ data to generate motion-compensated data for each image block. The method includes computing first stage image values at image grid point intersections of iso-range lines and vertical grid lines for each image bock based on the motion-compensated data for each image block. The method also includes computing second stage image values for the image grid point intersections by interpolation using the first stage image values at the image grid point intersections and correcting image phase of the second stage image values for the image grid point intersections to generate phase-corrected image values for each image block. The method includes generating a full-resolution SAR image by summing the phase-corrected image values for each image block.

16 Claims, 5 Drawing Sheets

(56) References Cited

U.S. PATENT DOCUMENTS

| | | | |
|---|---|---|---|
| 5,969,662 | A | 10/1999 | Hellsten |
| 6,603,424 | B1 | 8/2003 | Abatzoglou |
| 6,781,541 | B1 | 8/2004 | Cho |
| 6,864,827 | B1 * | 3/2005 | Tise et al. .................. 342/25 A |
| 7,006,031 | B1 | 2/2006 | Abatzoglou |
| 7,038,612 | B2 * | 5/2006 | Chow et al. .................. 342/25 F |
| 8,009,079 | B2 | 8/2011 | Connell et al. |
| 8,207,887 | B2 * | 6/2012 | Goldman .................. 342/25 A |
| 2003/0222807 | A1 | 12/2003 | Cho |
| 2006/0109164 | A1 | 5/2006 | Cho et al. |
| 2010/0321234 | A1 * | 12/2010 | Goldman .................. 342/25 A |
| 2011/0267223 | A1 | 11/2011 | Jin et al. |

OTHER PUBLICATIONS

Sack et al.; "Application of Efficient Linear FM Matched Filtering Algorithms to Synthetic Aperture Radar Processing"; IEE Proceedings; vol. 132, Pt. F, No. 1, pp. 45-57 (Feb. 1985).

Wang et al., "Auto-Combination of Sub-band for Spotlight SAR Imaging", Geoscience and Remote Sensing Symposium, 2005. IGARSS '05 Proceedings 2005 IEEE International, pp. 3325-3328 vol. 5, Jul. 25-29, 2005.

Jin, Michael J., "High Quality Spotlight Processing Algorithm Designed for LightSAR Mission", Geoscience and Remote Sensing, 1997, IGARSS '97, Remote Sensing—A Scientific Vision for Sustainable Development, pp. 477-480, Aug. 1997.

* cited by examiner

SAR IMAGE FORMATION

BACKGROUND

Exisitng synthetic aperture radar image formation systems and techniques are complex and computationally demanding. Range migration algorithm (RMA) methods require a straight and level flight path of the aircraft. Although aircraft path compensation to the first order is commonly built into the algorithm, image distortion may still be present at both ends of the range swath when the flight path deviates from certain bound. A second issue associated with RMA is that motion compensation becomes very computational demanding for a SAR system employing a wide beam in both elevation and azimuth, such as in ground penetration radar.

Polar format (PF) algorithm methods can tolerate more flight path turbulence by performing motion compensation repeatedly on a large number of image patches. However, since the wave front for the radar pulses follows an arc instead of a straight line its tomography-type processing leads to geometric distortion and phase distortion. Consequently, pixel phase continuity only presents within each small image patch. This greatly reduces its capability in coherent change detection (CCD). In addition, a close range SAR requires many image patches in Polar Format which makes the processing very inefficient.

In radar signal processing, both RMA and PF perform pulse-to-pulse processing during the initial data collection phase. The processing along the azimuth dimension is held until pulses equivalent to the full synthetic aperture have been acquired. This tends to leave a much higher computation load during batch processing. Consequently, it requires a processor with a relatively high computation throughput rate. For RMA, it requires a large memory buffer to store the range compressed data. Then, there is a need to perform a data corner turning process in order to access data in the azimuth direction. These demand a large size memory and fast I/O bandwidth from the processor.

SUMMARY

The technology described herein relates to synthetic aperture radar (SAR) image formation systems and techniques that produce high quality images for all major performance matrices. One embodiment is a synthetic aperture radar (SAR) imaging method. The method includes applying range pulse compression to SAR in-phase and quadrature (IQ) data for each image block of a SAR image grid to generate range-compressed IQ data for each image block. The method also includes applying pulse range frequency (PRF) decimation to the range-compressed IQ data to generate PRF-decimated range-compressed IQ data for each image block. The method also includes applying motion compensation to the PRF-decimated range-compressed IQ data to generate motion-compensated data for each image block. The method also includes computing first stage image values at image grid point intersections of iso-range lines and vertical grid lines for each image bock based on the motion-compensated data for each image block. The method also includes computing second stage image values for the image grid point intersections by interpolation using the first stage image values at the image grid point intersections. The method also includes correcting image phase of the second stage image values for the image grid point intersections to generate phase-corrected image values for each image block. The method also includes generating a full-resolution SAR image by summing the phase-corrected image values for each image block.

In some embodiments, applying motion compensation includes performing a fast Fourier transform in the SAR image grid range dimension. In some embodiments, the fast Fourier transform in the SAR image grid range dimension is performed in accordance with:

$$S'(n,i) = \sum_{k=0}^{Nfft-1} S(k,i) \cdot e^{-j2\pi \cdot n \frac{k}{Nfft}} \text{ for } i \in [1,2,3,\ldots,N_p]$$

where $S(k,i)$ is a two-dimensional range compressed SAR response with k being range bin index and i being pulse index, $N_p$ is number of pulses in a processing pulse group, and Nfft is the least integer power of 2 greater than the number of slant range bins covering the processed image block.

In some embodiments, the method includes calculating:

$$S_1(n,i) = S'(n,i) \cdot \text{Ref}(n)$$

by multiplying $S'(n,i)$ with a reference function of the form:

$$\text{Ref}(n) = \exp(-i2\pi \cdot n1 \cdot \Delta R(i)/\Delta r_s),$$

where $n=[1,2,3\ldots,\text{Nfft}]$, $n1=[0,1,2\ldots,\text{Nfft}/2-1,-\text{Nfft}/2,-\text{Nfft}/2+1,\ldots,-1]$, $\Delta R(i)=R(i)-R(i_c)$, where $R(i)$ is distance between a reference scatter and the SAR at pulse i which is within a range of $[1,2,3,\ldots,N_p]$, and $i_c=N_p/2+1$.

In some embodiments, the motion-compensated data for each image block is determined by performing a fast Fourier transform in the range dimension in accordance with:

$$S_{mocomp}(k,i) = \sum_{n=0}^{Nfft-1} S_1(n,i) \cdot e^{-j2\pi \cdot k \frac{n}{Nfft}} \text{ for } i \in [1,2,3,\ldots,N_p].$$

In some embodiments, the first stage image values are computed in accordance with:

$$S_{stage\_1}(R_j, fd(R_j,n)) = \sum_{i=1}^{N_p} S_{mocomp}(i,R_j) \cdot \exp(j2\pi \cdot fd(R_j,n) \cdot i')$$

where $i'=[-N_p/2,\ldots,-1,0,2,\ldots N_p/2-1]$, $fd(R_j,n)$ is Doppler frequency at $(R_j,n)$, $R_j=\|\bar{x}_{ac}(i_c)-(\bar{x}_b+n\cdot\hat{p}_{az}+\beta\cdot\hat{p}_{rg})\|$, $\bar{x}_b$ is position of each image block center, $\bar{x}_{ac}(i)$ is position of the SAR aircraft at the i-th pulse in the pulse group, $\hat{p}_{az}$ is azimuth unit vector of the image grid, $\hat{p}_{rg}$ is range unit vector of the image grid, n is azimuth coordinate index, $i_c=N_p/2+1$, $N_p$ is number of pulses in a processing pulse group, where n is the along-track pixel index and β is cross-track pixel index associated with the pixel having a slant range of $R_j$.

In some embodiments, the second stage image values are computed in accordance with:

$$S_{stage\_2}(m,n) = \sum_{k=1}^{K} S_{stage\_1}(R_j,n) \cdot w_k(R_j,m)$$

where $R(m,n)$ is distance between grid point (m,n) and $\bar{x}_{ac}(i_c)$, and $w_k(R_j,m)$ are the interpolation coffiicients determined based on the the range of the point (m,n) and $R_j$.

In some embodiments, the full-resolution SAR image is generated in accordance with:

$$S_{F\_res}(m, n) = \sum_{l=1}^{L} S(m, n, l) \cdot \exp\left\{-j4\pi \frac{R_{i_c(l),m,n}}{\lambda}\right\},$$

where $R_{i_c(l),m,n} = \|\vec{x}_{ac}(i_c(l)) - \vec{x}_{m,n}\|$, $i_c(l)$ is pulse index of the center pulse in group l, $\vec{x}_{ac}(i_c(l))$ is the aircraft position at the center of each pulse group, and $R_{i_c(l),m,n}$ is the distance between $\vec{x}_{ac}(i_c(l))$ and the image pixel (m,n).

Another embodiment is a synthetic aperture radar (SAR) imaging system. The system includes one or more processors, and a memory. The memory includes executable code representing instructions that when executed cause the system to apply range pulse compression to SAR in-phase and quadrature (IQ) data for each image block of a SAR image grid to generate range-compressed IQ data for each image block. The memory includes executable code representing instructions that when executed cause the system to apply pulse range frequency (PRF) decimation to the range-compressed IQ data to generate PRF-decimated range-compressed IQ data for each image block. The memory includes executable code representing instructions that when executed cause the system to apply motion compensation to the PRF-decimated range-compressed IQ data to generate motion-compensated data for each image block. The memory includes executable code representing instructions that when executed cause the system to compute first stage image values at image grid point intersections of iso-range lines and vertical grid lines for each image bock based on the motion-compensated data for each image block. The memory includes executable code representing instructions that when executed cause the system to compute second stage image values for the image grid point intersections by interpolation using the first stage image values at the image grid point intersections. The memory includes executable code representing instructions that when executed cause the system to correct image phase of the second stage image values for the image grid point intersections to generate phase-corrected image values for each image block. The memory includes executable code representing instructions that when executed cause the system to generate a full-resolution SAR image by summing the phase-corrected image values for each image block.

In some embodiments, the memory includes executable code representing instructions that when executed cause the system to apply motion compensation by performing a fast Fourier transform in the SAR image grid range dimension.

In some embodiments, the fast Fourier transform in the SAR image grid range dimension is performed in accordance with:

$$S'(n, i) = \sum_{k=0}^{Nfft-1} S(k, i) \cdot e^{-j2\pi \cdot n \frac{k}{Nfft}} \text{ for } i \in [1, 2, 3, \ldots, N_p]$$

where S(k,i) is a two-dimensional range compressed SAR response with k being range bin index and i being pulse index, $N_p$ is number of pulses in a processing pulse group, and Nfft is the least integer power of 2 greater than the number of slant range bins covering the processed image block.

In some embodiments, the method includes calculating:

$$S_1(n,i) = S'(n,i) \cdot \text{Ref}(n)$$

by multiplying S'(n,i) with a reference function of the form:

$$\text{Ref}(n) = \exp(-i2\pi \cdot n1 \cdot \Delta R(i)/\Delta r_s),$$

where n=[1,2,3 ..., Nfft], n1=[0,1,2 ...,Nfft/2−1,−Nfft/2,−Nfft/2+1, ... ,−1], ΔR(i)=R(i)−R($i_c$), where R(i) is distance between a reference scatter and the SAR at pulse i which is within a range of [1,2,3, ..., $N_p$], and $i_c$=$N_p$/2+1.

In some embodiments, the motion-compensated data for each image block is determined by performing a fast Fourier transform in the range dimension in accordance with:

$$S_{mocomp}(k, i) = \sum_{n=0}^{Nfft-1} S_1(n, i) \cdot e^{-j2\pi \cdot k \frac{n}{Nfft}} \text{ for } i \in [1, 2, 3, \ldots, N_p].$$

In some embodiments, the first stage image values are computed in accordance with:

$$S_{stage\_1}(R_j, fd(R_j, n)) = \sum_{i=1}^{N_p} S_{mocomp}(i, R_j) \cdot \exp(j2\pi \cdot fd(R_j, n) \cdot i')$$

where i'=[−$N_p$/2, ..., −1,0,2, ... $N_p$/2−1], fd($R_j$,n) is Doppler frequency at ($R_j$,n), $R_j$=$\|\vec{x}_{ac}(i_c) - (\vec{x}_b + n \cdot \hat{p}_{az} + \beta \cdot \hat{p}_{rg})\|$, $\vec{x}_b$ is position of each image block center, $\vec{x}_{ac}(i)$ is position of the SAR aircraft at the i-th pulse in the pulse group, $\hat{p}_{az}$ is azimuth unit vector of the image grid, $\hat{p}_{rg}$ is range unit vector of the image grid, n is azimuth coordinate index, $i_c$=$N_p$/2+1, $N_p$ is number of pulses in a processing pulse group, where n is the along-track pixel index and β is cross-track pixel index associated with the pixel having a slant range of $R_j$.

In some embodiments, the second stage image values are computed in accordance with:

$$S_{stage\_2}(m, n) = \sum_{k=1}^{K} S_{stage\_1}(R_j, n) \cdot w_k(R_j, m)$$

where R(m,n) is distance between grid point (m,n) and $\vec{x}_{ac}(i_c)$, and $w_k(R_j,m)$ are the interpolation coffiicients determined based on the the range of the point (m, n) and $R_j$.

In some embodiments, the full-resolution SAR image is generated in accordance with:

$$S_{F\_res}(m, n) = \sum_{l=1}^{L} S(m, n, l) \cdot \exp\left\{-j4\pi \frac{R_{i_c(l),m,n}}{\lambda}\right\},$$

where $R_{i_c(l),m,n} = \|\vec{x}_{ac}(i_c(l)) - \vec{x}_{m,n}\|$, $i_c(l)$ is pulse index of the center pulse in group l, $\vec{x}_{ac}(i_c(l))$ is the aircraft position at the center of each pulse group, and $R_{i_c(l),m,n}$ is the distance between $\vec{x}_{ac}(i_c(l))$ and the image pixel (m,n).

The SAR methods and systems described herein (hereinafter "technology") can provide one or more of the following advantages. One advantage of the technology is that the technology preserves the phase of all ground scatters within an image and synthesizes high resolution images from lower resolution images from the image domain. The technology provides high image quality in terms of impulse response and geometric accuracy. The technology is insensitive to flight path turbulence. The technology provides phase continuity within the entire image. The technology reduces the computation load of the batch processing by performing both azimuth processing and range processing during pulse collection phase. The technology breaks the SAR processing task into coarse grain jobs such that it may fully utilize the processing power of a processor that has a very large number of processing nodes.

BRIEF DESCRIPTION OF THE DRAWINGS

The foregoing features of various embodiments of the invention will be more readily understood by reference to the following detailed descriptions in the accompanying drawings.

DETAILED DESCRIPTION OF ILLUSTRATIVE EMBODIMENTS

Figure 1:
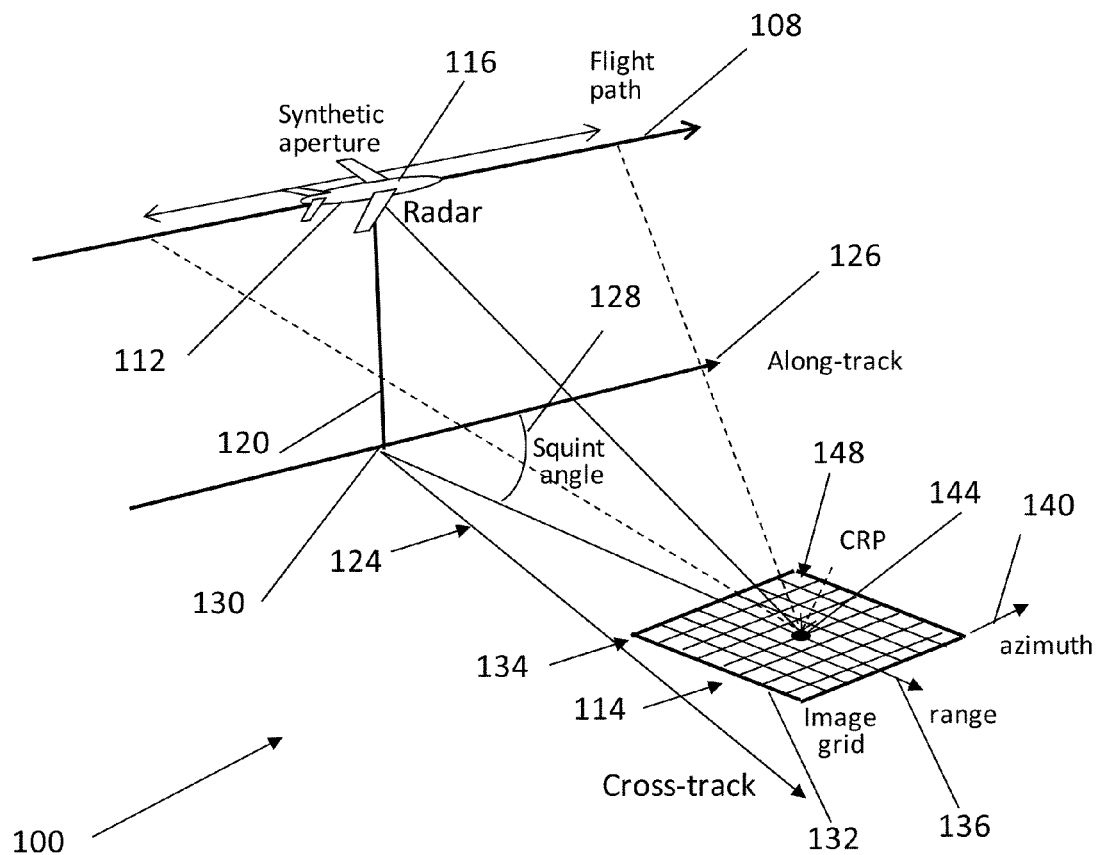
FIG. 1 is a schematic illustration of a SAR geometry and image coordinate system, according to an illustrative embodiment.

FIG. 1 is a schematic illustration of a SAR geometry and image coordinate system, according to an illustrative embodiment. In this embodiment, the coordinate system used is along-track/cross-track/down coordinate system. Along-track 126 follows the flight direction 104 of the aircraft 112. The radar 16 is located on the aircraft 122. The direction towards the bottom 120 of the figure points to the center of Earth. The land cross-track 124 direction conforms to the right-hand rule. The imaging geometry of a spotlight mode is depicted in FIG. 1. In this example, the radar 116 pointing has a squint angle 128. The image grid 132 follows the range direction 136 and azimuth direction 140. A plurality of image blocks 148 forms the image grid 132. The aircraft ground projection 420 is the projected location of the aircraft relative to the ground.

An antenna of the aircraft 112 illuminates a patch 114 as the aircraft moves along the flight path 108. The antenna illuminates the patch 114 by transmitting radar pulses towards the patch 114 and by receiving corresponding radar return pulses to generate the SAR image array. Typically a complete array has $2^n$ pulses (e.g., 256, 512, 2048 pulses) so it is compatible with Fast Fourier Transform (FFT) processing to be performed on the pulses to generate the SAR image.

Table 1 includes variables used in describing the embodiment. In this image processing technique, the position of a frame reference point at the top-left corner 134 of the image grid 132 is determined in accordance with:

$$\vec{x}_{FM\_ref} = \vec{x}_{CRP} - L_{FM}/2 \cdot \hat{p}_{rg} - L_{FM}/2 \cdot \hat{p}_{az} \qquad \text{EQN. 1,}$$

and $\vec{x}_{m,n}$ is the position of an image grid 132 point with grid index of m and n, which is determined in accordance with:

$$\vec{x}_{m,n} = \vec{x}_{FM\_ref} + (m \cdot \hat{p}_{rg} + n \cdot \hat{p}_{az}) \cdot \Delta x \qquad \text{EQN. 2.}$$

The Doppler of $\vec{x}_{m,n}$ with respect to $\vec{x}_{ac}(i)$ is $fd_{i,m,n}$ and is given by:

$$fd_{i,m,n} = \frac{-2\vec{v}_{ac}(i) \cdot (\vec{x}_{ac}(i) - \vec{x}_{m,n})}{\lambda \cdot \|\vec{x}_{ac}(i) - \vec{x}_{m,n}\|} \qquad \text{EQN. 3}$$

TABLE 1

Imaging variables

| Variable | Definition |
|---|---|
| $\vec{x}_{CRP}$ | Position vector of center reference point 144 of image grid |
| $\hat{p}_{rg}$ | Range (ground) unit vector of the image grid 132 |
| $\hat{p}_{az}$ | Azimuth unit vector of the image grid 132 |
| $L_{FM}$ | Image frame size |
| $\Delta x$ | Image grid spacing |
| $\vec{x}_b$ | Position of center of each image block 148 of the image grid 132 |
| $\vec{x}_{ac}(i)$ | Position of aircraft 112 at the i-th pulse in the pulse group of the radar pulses |
| $\vec{v}_{ac}(i)$ | Velocity of aircraft 112 at the i-th pulse in the pulse group of the radar pulses |
| $\Delta r_s$ | Range bin sampling distance of the range compressed data |
| $N_p$ | Number of pulses in a processing pulse group, an even integer |
| $N_{blk}$ | Number of grid points in each dimension of an image block of the image grid 132 |
| $R_{i,m,n}$ | Distance between $\vec{x}_{ac}(i)$ and $\vec{x}_{m,n}$. Given by $R_{i,m,n} = \|\vec{x}_{ac}(i) - \vec{x}_{m,n}\|$ |

Figure 2:
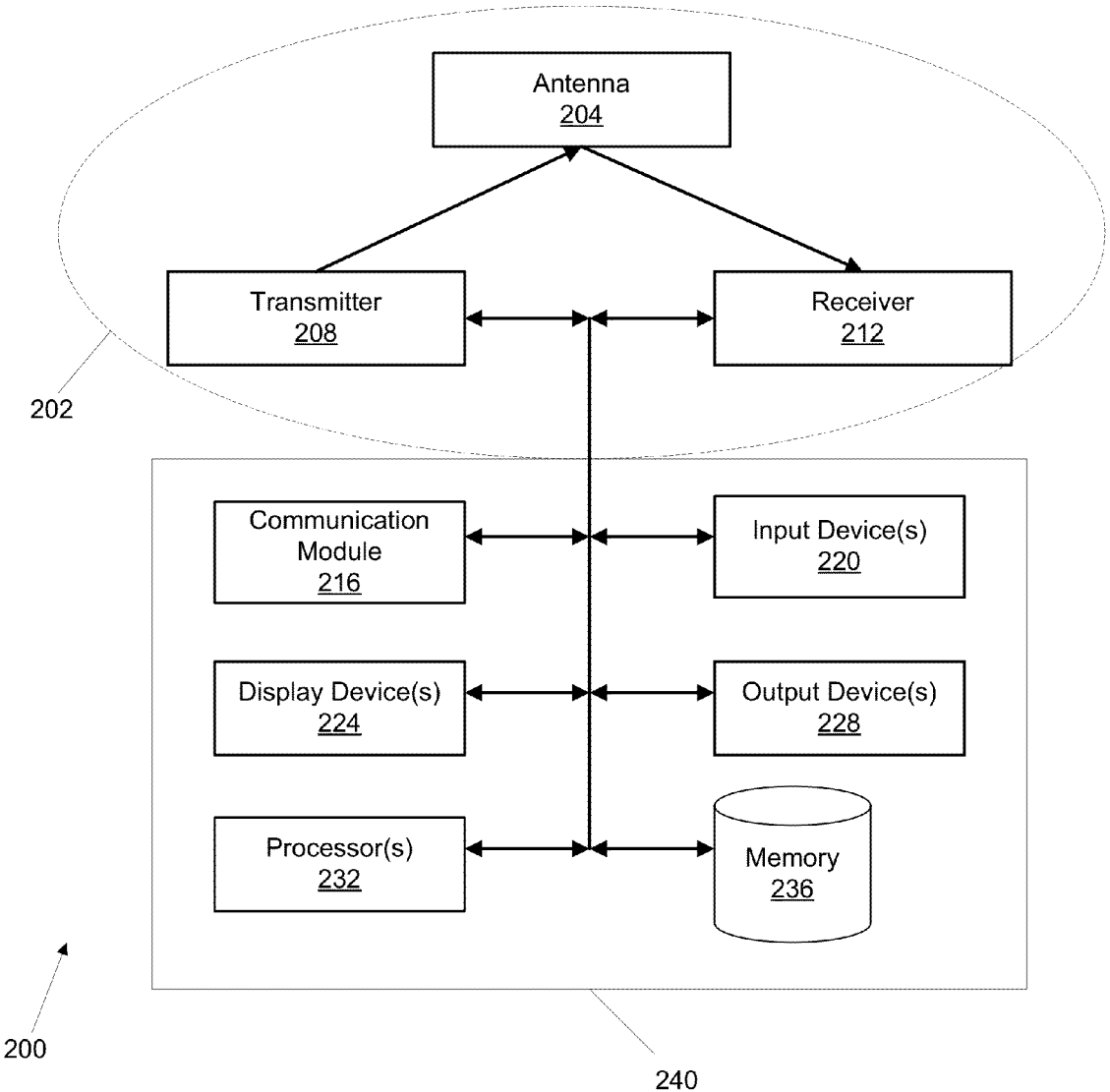
FIG. 2 is a schematic illustration of components of a SAR imaging system, according to an illustrative embodiment.

FIG. 2 is a schematic illustration of components of a SAR imaging system 200, according to an illustrative embodiment. In one embodiment, the SAR imaging system 200 is a component of an aircraft used in performing the SAR imaging (e.g., aircraft 112 of FIG. 1). The system 200 includes a synthetic aperture radar (SAR) module 202 (e.g., radar 116 of FIG. 1) and a controller 240 for operating the SAR module 202. The SAR module 202 includes a transmitter 208, a receiver 212, and an antenna 204. The controller 240 outputs radar transmission signals to the transmitter 208 which sends transmission signals to the antenna 204 to transmit the radar pulses towards an imaging patch (e.g., patch 114 of FIG. 1). The antenna 204 receives the radar return pulses and provides the radar return pulses to the receiver 212 which then provides the radar return pulses to the controller 240 for subsequent processing, for example, for generating a full SAR image, as described herein.

The controller 240 includes a communication module 216, one or more input devices 220, one or more output devices 228, one or more display devices 224, one or more processors 232, and memory 236. The modules and devices described herein can, for example, utilize the processor 232 to execute computer executable instructions and/or the modules and devices described herein can, for example, include their own processor to execute computer executable instructions. It should be understood the controller 240 can include, for example, other modules, devices, and/or processors known in the art and/or varieties of the described modules, devices, and/or processors.

The communication module 216 includes circuitry and code corresponding to computer instructions that enable the computing device to send/receive signals to/from the antenna 204. For example, the communication module 216 provides commands from the processor 232 to the transmitter 208 to control how the antenna 204 transmits radar pulses during operation. The communication module 216 also, for example, receives data corresponding to the radar return pulses received by the receiver 212. The received data can be, for example, stored by the memory 236 or otherwise processed by the processor 232.

The input devices 220 receive information from a user (not shown) and/or another computing system (not shown). The input devices 220 can include, for example, a keyboard, a scanner, a microphone, a stylus, a touch sensitive pad or display. The output devices 228 output information associated with the controller 240 (e.g., information to a printer, information to a speaker, information to a display, for example, graphical representations of information). The processor 232 executes the operating system and/or any other computer executable instructions for the controller 240 (e.g., executes applications). The memory 236 stores a variety of information/data, including profiles used by the controller 240 to specify how the system 200 generates the full SAR image. The memory 236 can include, for example, long-term storage, such as a hard drive, a tape storage device, or flash memory; short-term storage, such as a random access memory, or a graphics memory; and/or any other type of computer readable storage.

Figure 3:
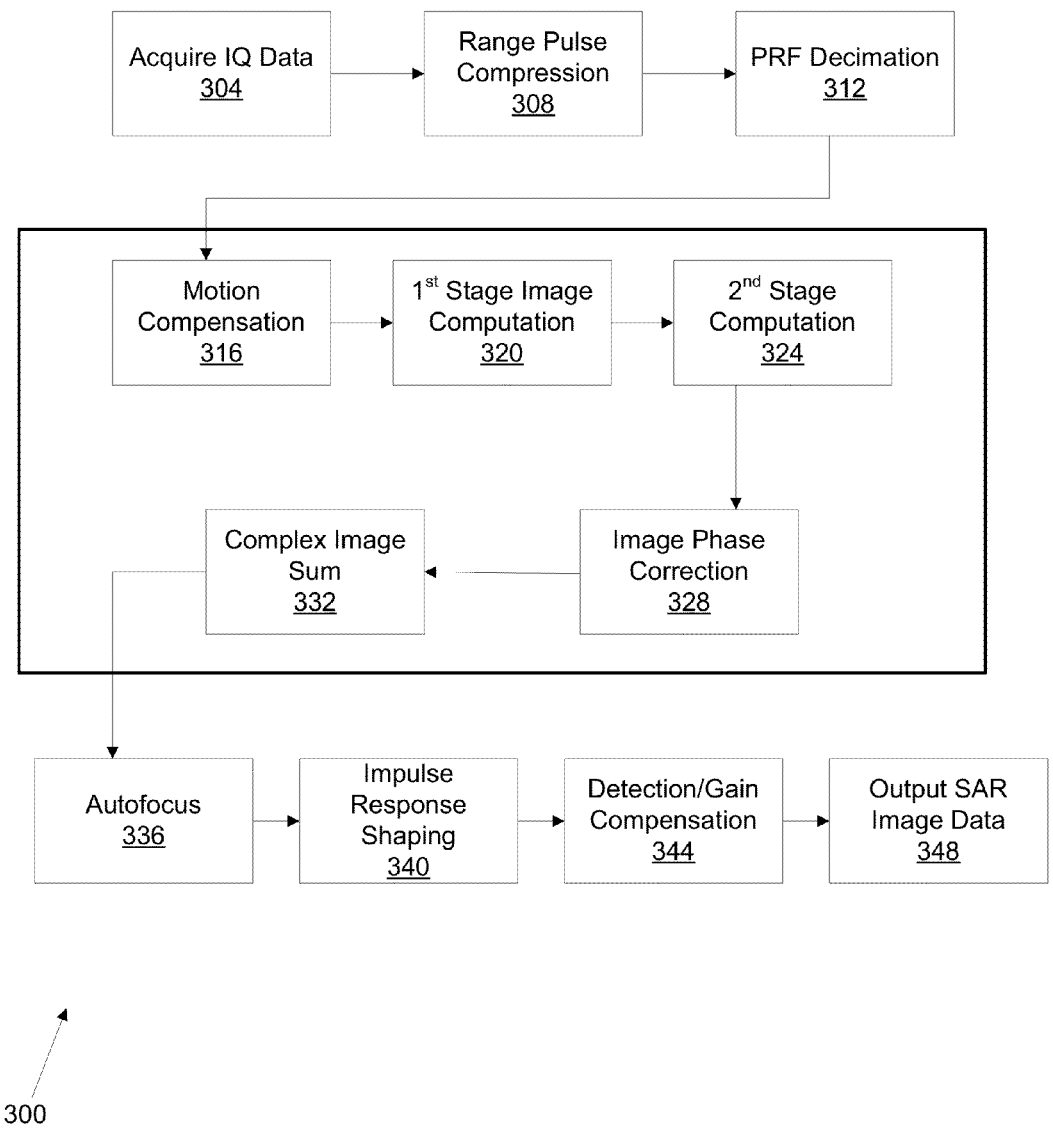
FIG. 3 is a flowchart of a SAR imaging method, according to an illustrative embodiment.

FIG. 3 is a flowchart 300 of a SAR imaging method, according to an illustrative embodiment. The imaging method can be implemented using a SAR imaging system (e.g., the SAR imaging system 200 of FIG. 2 in accordance with the environment of FIG. 1). The method includes acquiring in-phase and quadrature (IQ) data (step 304) for each image block of a SAR image grid. The IQ data is the input data to which the technology is applied.

The method then includes applying range pulse compression (step 308) to the IQ data for each image block of the SAR image grid to generate range-compressed IQ data for each image block. In collecting the SAR IQ data, a long-duration frequency modulated pulse is typically transmitted. The pulse has the property that, when filtered with a matched filter, the result is a narrow pulse in which all the pulse energy has been collected to the peak value. Matched filtering of the received pulses is called range compression. Range compression is performed on each range line of SAR IQ data using a Fast Fourier Transform (FFT) method. The frequency domain range matched filter is generated once, and it is applied to each range line. The range matched filter is typically computed or generated from a replica of the transmitted pulse. In addition, the range matched filter frequency response typically includes an amplitude weighting to control sidelobes in the range impulse response.

The method then includes applying pulse range frequency (PRF) decimation (step 312) to reduce the pulse sampling rate. PRF decimation is accomplished first by convolving the range-compressed IQ data with the kernel of an along-track band-pass filter to remove the spectra outside of the imaged area. It is then followed by a down sampling step to reduce the pulse rate.

The method then includes applying motion compensation (step 316) to the PRF-decimated range-compressed IQ data to generate motion-compensated data for each image block. The range-compressed radar return IQ data (from a point-like scatter) has an impulse-like function with its peak position located at a delay determined by its distance to the aircraft position. In this embodiment, to simplify the description, range distance is used instead of delay time and the radar range gate begins when the pulse is leaving the aircraft. At the peak of the impulse response, there is also a phase term given by the two-way distance and the center wavelength. With respect to the pulse index, this phase profile mainly includes a constant term which is the phase at the center pulse, a linear term proportional to the Doppler of the scatter, and a quadratic term.

The motion compensation process use a reference scatter in the image block center to determine the range and phase profile to be compensated. It performs range migration correction such that scatter peak responses are aligned at the same range bin as that of the center pulse. This range migration correction applies to all scatters in the image block. In addition, the quadratic phase is also removed. Implementation of motion compensation also takes into account the slight variation of the quadratic phase as a function of range. The range migration correction is implemented by FFT of the range compressed data block, associated with the image block, reference multiplication, and inverse FFT of the composite spectra.

In this implementation, S(k,i) represents the two-dimensional range compressed SAR response with k being the range bin index and i being the pulse index. The reference function generated for motion compensation is given by:

$$\text{Ref}(n) = \exp(i2\pi \cdot n1 \cdot \Delta R(i)/\Delta r_s), \quad \text{EQN. 4}$$

where n=[1,2,3 . . . , Nfft], n1=[0,1,2 . . . , Nfft/2−1,−Nfft/2,−Nfft/2+1, . . . ,−1], $\Delta R(i) = R(i) - R(i) - R(i_c)$, where R(i) is the distance between the reference scatter and the aircraft at pulse i which is within the range of [1,2,3, . . . ,$N_p$], $i_c$ is the index of center pulse (i.e., $i_c = N_p/2+1$), $N_p$ is the number of pulses in a processing pulse group, and Nfft is the least integer power of 2 greater than the number of slant range bins covering the processed image block.

In motion compensation, the first step is to perform a fast Fourier transform for S(k,i) in the range dimension, in accordance with:

$$S'(n, i) = \sum_{k=0}^{Nfft-1} S(k, i) \cdot e^{-j2\pi \cdot n \frac{k}{Nfft}} \text{ for } i \in [1, 2, 3, \ldots, N_p] \quad \text{EQN. 5}$$

Then, this signal spectrum is multiplied with the reference function in accordance with:

$$S_1(n,i) = S'(n,i) \cdot \text{Ref}(n) \quad \text{EQN. 6}$$

The last step is to perform an inverse fast Fourier transform in the range dimension in accordance with:

$$S_{mocomp}(k, i) = \sum_{n=0}^{Nfft-1} S_1(n, i) \cdot e^{-j2\pi \cdot k \frac{n}{Nfft}} \text{ for } i \in [1, 2, 3, \ldots, N_p] \quad \text{EQN. 7}$$

Within the processed image block, the range migration of scatters at different azimuth location will not be completely removed since their range migration profiles are slightly different from that of the center scatter. However, if the residual range migration is less than a small fraction of a range bin, it has very little impact to the final impulse response. However, if the chosen image block size is large, this residual range migration will be significant such that it will degrade the final 2D impulse response. In such case, the solution is to introduce the keystone process [x] after motion compensation to completely remove the range migration of all scatters in the image block. Keystone processing removes the linear term of target range migration in the SAR data. This is performed in a group of SAR data pulses after range filtering by rescaling the slow time following in accordance with:

$$t1 = f_c/(f+f_c) \cdot t, \quad \text{EQN. 8}$$

where t is the slow time, $f_c$ is the center frequency and $f+f_c$ is the frequency of the rescaled data; and as further described in "SAR Imaging of Moving Targets", Perry, et al. IEEE Transactions on Aerospace and Electronic Systems, Vol. 35, No. 1, January 1999; the entire contents of which is hereby incorporated by reference.

Figure 4:
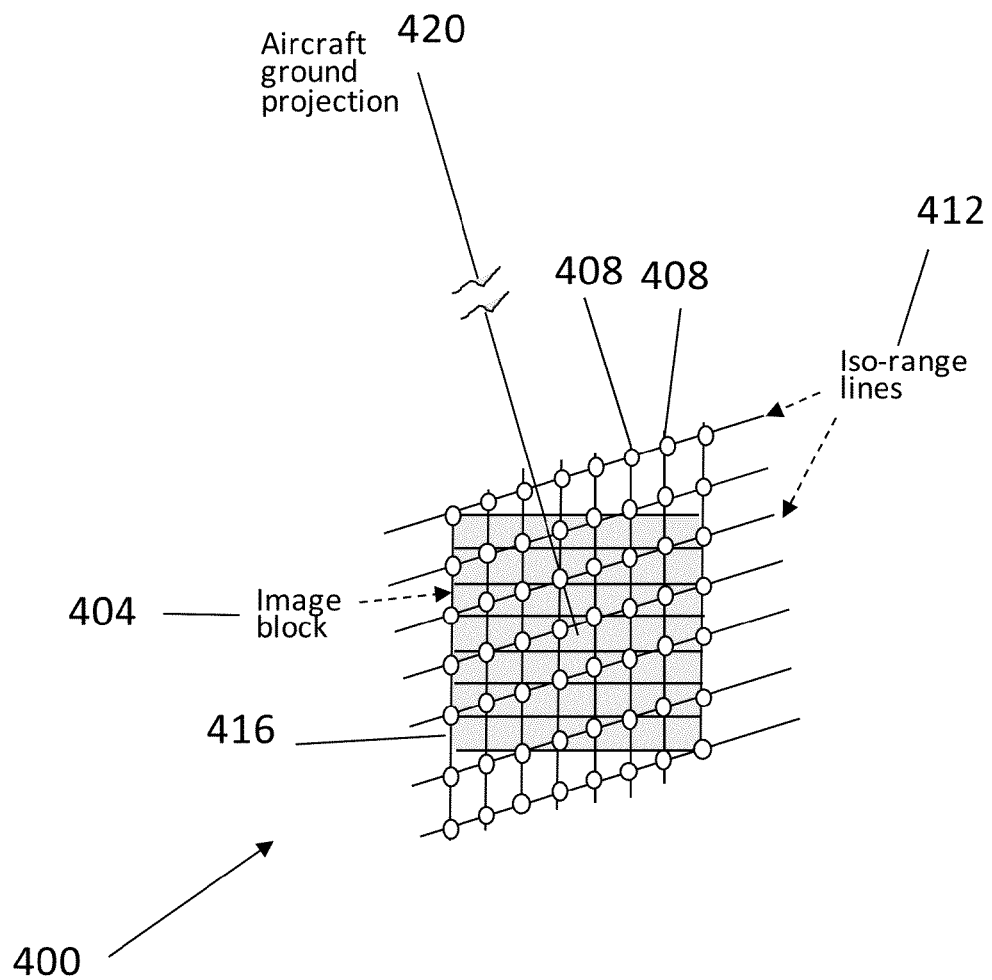
FIG. 4 is a schematic illustration of SAR image block and pixel locations for first stage image values, according to an illustrative embodiment.

The method then includes computing first stage image values (step 320) at image grid point intersections of iso-range lines and vertical grid lines for each image bock based on the motion-compensated data for each image block. FIG. 4 is a schematic illustration 400 of a SAR image block 404 and pixel locations 404 for first stage image values. FIG. 4 also depicts iso-range lines 412 and vertical grid lines 416 defining the grid point intersections at the pixel locations 408. The aircraft ground projection 420 is the projected location of the aircraft relative to the ground.

Computing the first stage image values involves compute image values at the pixel locations 408. The 'range' in the iso-range term is the distance of the pixel location 408 to the antenna (e.g., antenna the radar 116 of FIG. 1). This is different than the range coordinate in the vertical direction of the image coordinate. To determine the data window to work with, it requires the knowledge of the minimum and maximum slant range of all pixels in the image block. $R_{min}$ and $R_{max}$ are defined as these ranges. The method includes processing range bins from $R_{start}$ to $R_{end}$, where this range window is several range pixels longer than the window given by $R_{min}$ and $R_{max}$. By extending the range window to be longer in this manner, the system is able to have more pixels to perform interpolation in the following processing stage.

As shown in FIG. 4, the location of the small circular dots 408 needs to be computed from its slant range and the azimuth coordinate. In fact, the only unknown of this point is the vertical coordinate. The vertical coordinate is obtained from solving the unknown β from the following equation $$R_j = \|\vec{x}_{ac}(i_c) - (\vec{x}_b + n \cdot \hat{p}_{az} + \beta \cdot \hat{p}_{rg})\|, \qquad \text{EQN. 9}$$

where $\vec{x}_b$ is the location of the block center, n is the along-track pixel index and β is cross-track pixel index associated with the pixel having a slant range of $R_j$. After the location of the circular dot is obtained, we compute its Doppler frequency using EQN. 3. Let the azimuth coordinate index be n, the Doppler frequency at $(R_j,n)$ is expressed as $fd(R_j,n)$.

The image value of this circular point is obtained by filtering the motion compensated data at the given Doppler frequency for the range bin corresponding to $R_j$, where $R_{start} \leq R_j \leq R_{end}$. This filtering process preserves the phase, at the center pulse, of the scatter. The 1D motion compensated data at the range of $R_j$ is determined in accordance with $S_{mocomp}(i), i=[1,2,\ldots,N_p]$. The filtering process is expressed in accordance with:

$$S_{stage\_1}(R_j, fd(R_j, n)) = \sum_{i=1}^{N_p} S_{mocomp}(i, R_j) \cdot \exp(j2\pi \cdot fd(R_j, n) \cdot i') \qquad \text{EQN. 10}$$

where $i'=[-N_p/2,\ldots,-1,0,2,\ldots N_p/2-1]$. The use of i' instead of i is for preserving the scatter phase. The notation of the output $S_{stage\_1}(R_j,fd(R_j,n))$ is simplified as $S_{stage\_1}(R_j,n)$.

The next stage of the method includes computing second stage image values (step 324) for the image grid point intersections by interpolation using the first stage image values at the image grid point intersections. The is accomplished by interpolation along the first dimension of $S_{stage\_1}(R_j,n)$. The output image value of grid point (m,n) is given by $S_{stage\_2}(m,n)$. In this process, the first step is to compute the distance between the grid point (m,n) and the aircraft position $\vec{x}_{ac}(i_c)$. The interpolation is determined in accordance with:

$$S_{stage\_2}(m, n) = \sum_{k=1}^{K} S_{stage\_1}(R_j, n) \cdot w_k \qquad \text{EQN. 11}$$

where R(m,n) is distance between grid point (m,n) and $\vec{x}_{ac}(i_c)$, and $w_k(R_j,m)$ are the interpolation cofiicients determined based on the the range of the point (m,n) and $R_j$.

Figure 5:
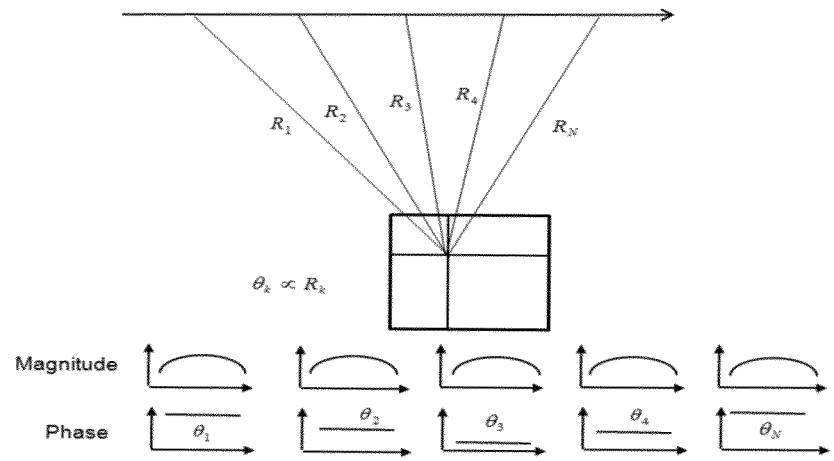
FIG. 5 is a schematic illustration of magnitude and phase of a single scatter processed by different pulse groups, according to an illustrative embodiment.

Before storing the computed image value into the image buffer, a phase correction step is performed. The method includes correcting image phase of the second stage image values (step 328) for the image grid point intersections to generate phase-corrected image values for each image block. This is performed because the same scatter processed by different pulse groups has different phase values as shown in FIG. 5. The phase is removed in to permit for coherent summing of the low resolution images.

Figure 6:
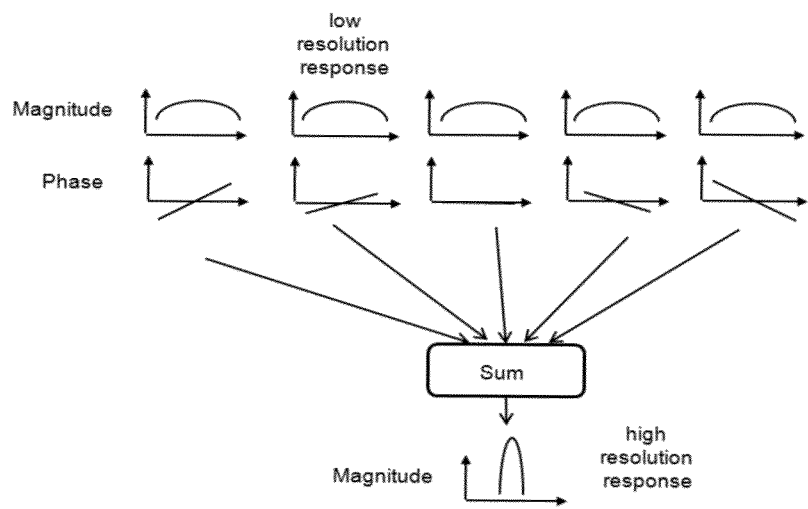
FIG. 6 is a schematic illustration of image domain resolution syntheses after phase correction, according to an illustrative embodiment.

In this step of process, the phases of all image grid points within the image block is computed by their distance to the aircraft position at the center of its own pulse group. This process creates ramp like phases, as shown in FIG. 6, for the neighboring points of each scatter. Phase correction is performed by dividing the total number of pulses into L groups, where the low resolution image processed from pulse group l is denoted as S(m,n,l), where m and n are the pixel indices. $i_c(l)$ is the pulse index of the center pulse in group l. Therefore, $\vec{x}_{ac}(i_c(l))$ is the aircraft position at the center of each pulse group. The distance between $\vec{x}_{ac}(i_c(l))$ and the image pixel (m,n) is determined in accordance with:

$$R_{i_c(l),m,n} = \|\vec{x}_{ac}(i_c(l)) - \vec{x}_{m,n}\| \qquad \text{EQN. 12}$$

The full resolution image is formed by coherently summing 332 these phase corrected responses to generate a sharply defined scatter image in accordance with:

$$S_{F\_res}(m, n) = \sum_{l=1}^{L} S(m, n, l) \cdot \exp\left\{-j4\pi \frac{R_{i_c(l),m,n}}{\lambda}\right\}, \qquad \text{EQN. 13}$$

producing a high resolution response as illustrated as the output of the summing block in FIG. 6. Steps 316, 320, 324, 328, and 332 are performed for all the image blocks.

In some embodiments, the method includes the optional steps of autofocus (step 336), impulse response shaping (step 340), detection/gain compensation (step 344), and outputting the SAR image data (step 348). The autofocus process (step 336) estimate the nonlinear phase associated with targets in the image and then removes the phase error to yield a well focused image. Various autofocus processes can be used, including those described in EP 1367409B1, issued to Cho, "System and Method for Focusing SAR images," U.S. Published Application No. 2003/0222807 by Cho, "Focusing SAR Images Formed by RMA with Arbitrary Orientation," U.S. Pat. No. 6,781,541, issued to Cho, "Estimation and Correction of Phase for Focusing Search Mode SAR Images Formed by Range Migration Algorithm," U.S. Pat. No. 8,009,079, issued to Connell et al,, "Methods For Two-Dimensional Autofocus in High Resolution Radar Systems," and U.S. Published Application No. 2006/0109164 by Cho et al., "Efficient Autofocus Method for Swath SAR;" The entire contents of each of these references hereby incorporated by reference.

The impulse response shaping process (step 340) can be performed by, for example, applying a Taylor weighted taper in both range and azimuth dimension. Impulse response shaping is often applied to achieve a more uniform resolution over the entire image area by applying weighting coefficients to the pulses. In each dimension, this process is performed in accordance with $$S(x) = \text{FFF}^{-1}(\text{FFT}(S(x)) \cdot W_{Taylor}(X)) \qquad \text{EQN. 14}$$

The detection process of step 344 can be performed by, for example, converting the complex SAR image pixel in-phase and quadrature data (I,Q) into real SAR image pixel value S in accordance with:

$$S = \sqrt{I^2 + Q^2} \qquad \text{EQN. 15}$$

The gain compensation process of step 344 can be performed by, for example, removing the gain modulation due to the antenna pattern onto the SAR image based on the knowledge of the antenna pointing direction and the antenna pattern. This process can be performed in accordance with:

$$S_1(x,y) = S(x,y) \cdot G^{-1}(x,y) \quad \text{EQN. 16}$$

The above-described systems and methods can be implemented in digital electronic circuitry, in computer hardware, firmware, and/or software. The implementation can be as a computer program product that is tangibly embodied in non-transitory memory device. The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors, or one or more servers that include one or more processors, that execute a computer program to perform functions of the disclosure by operating on input data and generating output. Method steps can also be performed by, and an apparatus can be implemented as, special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data. Magnetic disks, magneto-optical disks, or optical disks are examples of such storage devices.

Data transmission and instructions can occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A synthetic aperture radar (SAR) imaging method for processing moving air borne radar acquired images for multiple performance matrices, the method comprising:
    physically acquiring SAR in-plane and quadratic data from a scan of an image grid
    applying range pulse compression to SAR in-phase and quadrature (IQ) data for each image block of a SAR image grid to generate range-compressed IQ data for each image block;
    applying pulse range frequency (PRF) decimation to the range-compressed IQ data to generate PRF-decimated range-compressed IQ data for each image block;
    applying motion compensation to the PRF-decimated range-compressed IQ data to generate motion-compensated data for each image block;
    computing first stage image values at image grid point intersections of iso-range lines and vertical grid lines for each image block based on the motion-compensated data for each image block;
    computing second stage image values for the image grid point intersections by interpolation using the first stage image values at the image grid point intersections;
    correcting image phase of the second stage image values for the image grid point intersections to generate phase-corrected image values for each image block; and
    generating a full-resolution SAR image by summing the phase-corrected image values for each image block.

2. The method of claim 1, wherein the step of applying motion compensation comprises performing a fast Fourier transform in the SAR image grid range dimension.

3. The method of claim 2, wherein the fast Fourier transform in the SAR image grid range dimension is performed in accordance with:

$$S'(n, i) = \sum_{k=0}^{N\!f\!f\!t-1} S(k, i) \cdot e^{-j2\pi \cdot n \frac{k}{N\!f\!f\!t}} \text{ for } i \in [1, 2, 3, \ldots, N_p]$$

where S(k,i) is a two-dimensional range compressed SAR response with k being range bin index and i being pulse index, $N_p$ is number of pulses in a processing pulse group, and Nfft is the least integer power of 2 greater than the number of slant range bins covering the processed image block.

4. The method of claim 3, comprising calculating $$S_1(n,i) = S'(n,i) \cdot \text{Ref}(n)$$

by multiplying S'(n,i) with a reference function of the form:

$$\text{Ref}(n) = \exp(-i2\pi \cdot n1 \cdot \Delta R(i)/\Delta r_s),$$

where n=[1,2,3 . . . , Nfft], n1=[0,1,2 . . . , Nfft/2−1,−Nfft/2,−Nfft/2+1, . . . , −1], ΔR(i)=R(i)−R(i$_c$), where R(i) is distance between a reference scatter and the SAR at pulse i which is within a range of [1,2,3, . . . , N$_p$], and i$_c$=N$_p$/2+1.

5. The method of claim 4, wherein the motion-compensated data for each image block is determined by performing a fast Fourier transform in the range dimension in accordance with:

$$S_{mocomp}(k, i) = \sum_{n=0}^{N\!f\!f\!t-1} S_1(n, i) \cdot e^{-j2\pi \cdot k \frac{n}{N\!f\!f\!t}} \text{ for } i \in [1, 2, 3, \ldots, N_p].$$

6. The method of claim 1, wherein the first stage image values are computed in accordance with:

$$S_{stage\_1}(R_j, fd(R_j, n)) = \sum_{i=1}^{N_p} S_{mocomp}(i, R_j) \cdot \exp(j2\pi \cdot fd(R_j, n) \cdot i')$$

where $i'=[-N_p/2, \ldots, -1, 0, 2, \ldots N_p/2-1]$, $fd(R_j,n)$ is Doppler frequency at $(R_j,n)$, $R_j = \|\bar{x}_{ac}(i_c) - (\bar{x}_b + n \cdot \hat{p}_{az} + \beta \cdot \hat{p}_{rg})\|$, $\bar{x}_b$ is position of each image block center, $\bar{x}_{ac}(i)$ is position of the SAR aircraft at the i-th pulse in the pulse group, $\hat{p}_{az}$ is azimuth unit vector of the image grid, $\hat{p}_{rg}$ is range unit vector of the image grid, n is azimuth coordinate index, $i_c = N_p/2+1$, $N_p$ is number of pulses in a processing pulse group, where n is the along-track pixel index and $\beta$ is cross-track pixel index associated with the pixel having a slant range of $R_j$.

7. The method of claim 6, wherein the second stage image values are computed in accordance with:

$$S_{stage\_2}(m, n) = \sum_{k=1}^{K} S_{stage\_1}(R_j, n) \cdot w_k(R_j, m)$$

where $R(m,n)$ is distance between grid point $(m,n)$ and $\bar{x}_{ac}(i_c)$, and $w_k(R_j,m)$ are the interpolation coffiicients determined based on the range of the point $(m,n)$ and $R_j$.

8. The method of claim 7, wherein the full-resolution SAR image is generated in accordance with:

$$S_{F\_res}(m, n) = \sum_{l=1}^{L} S(m, n, l) \cdot \exp\left\{-j4\pi \frac{R_{i_c(l),m,n}}{\lambda}\right\},$$

where $R_{i_c(l),m,n} = \|\bar{x}_{ac}(i_c(l)) - \bar{x}_{m,n}\|$, $i_c(l)$ is pulse index of the center pulse in group $l$, $\bar{x}_{ac}(i_c(l))$ is the aircraft position at the center of each pulse group, and $R_{i_c(l),m,n}$ is the distance between $\bar{x}_{ac}(i_c(l))$ and the image pixel $(m,n)$.

9. A synthetic aperture radar (SAR) imaging system for processing moving images acquired by moving airborne radar apparatus to provide images in multiple performance metrices, the system comprising:
(a) radar apparatus for acquiring from SAR in-plane and quadrature data from a scan of an image;
(b) one or more computer hardware processors; and
(c) a memory, the memory including executable code representing instructions that when executed cause the system to:
(i) apply range pulse compression to SAR in-phase and quadrature (IQ) data for each image block of a SAR image grid to generate range-compressed IQ data for each image block;
(ii) apply pulse range frequency (PRF) decimation to the range-compressed IQ data to generate PRF-decimated range-compressed IQ data for each image block;
(iii) apply motion compensation to the PRF-decimated range-compressed IQ data to generate motion-compensated data for each image block;
(iv) compute first stage image values at image grid point intersections of iso-range lines and vertical grid lines for each image bock based on the motion-compensated data for each image block;
(v) compute second stage image values for the image grid point intersections by interpolation using the first stage image values at the image grid point intersections;

(vi) correct image phase of the second stage image values for the image grid point intersections to generate phase-corrected image values for each image block; and
(vii) generate a full-resolution SAR image by summing the phase-corrected image values for each image block.

10. The system of claim 9, wherein the memory includes executable code representing instructions that when executed cause the system to apply motion compensation by performing a fast Fourier transform in the SAR image grid range dimension.

11. The system of claim 10, wherein the fast Fourier transform in the SAR image grid range dimension is performed in accordance with:

$$S'(n, i) = \sum_{k=0}^{Nfft-1} S(k, i) \cdot e^{-j2\pi \cdot n \frac{k}{Nfft}} \text{ for } i \in [1, 2, 3, \ldots, N_p]$$

where $S(k,i)$ is a two-dimensional range compressed SAR response with k being range bin index and i being pulse index, $N_p$ is number of pulses in a processing pulse group, and Nfft is the least integer power of 2 greater than the number of slant range bins covering the processed image block.

12. The system of claim 11, comprising wherein the memory includes executable code representing instructions that when executed cause the system to calculate $$S_1(n,i) = S'(n,i) \cdot \text{Ref}(n)$$

by multiplying $S'(n,i)$ with a reference function of the form:

$$\text{Ref}(n) = = \exp(-i2\pi \cdot n1 \Delta R(i)/\Delta r_s),$$

where $n=[1,2,3\ldots,Nfft]$, $n1=[0,1,2\ldots,Nfft/2-1,-Nfft/2,-Nfft/2+1,\ldots,-1]$, $\Delta R(i)=R(i)-R(i_c)$, where $R(i)$ is distance between a reference scatter and the SAR at pulse i which is within a range of $[1,2,3,\ldots,N_p]$, and $i_c=N_p/2+1$.

13. The system of claim 12, wherein the memory includes executable code representing instructions that when executed cause the system to determine the motion-compensated data for each image block by performing a fast Fourier transform in the range dimension in accordance with $$S_{mocomp}(k, i) = \sum_{n=0}^{Nfft-1} S_1(n, i) \cdot e^{-j2\pi \cdot k \frac{n}{Nfft}} \text{ for } i \in [1, 2, 3, \ldots, N_p].$$

14. The system of claim 13, wherein the memory includes executable code representing instructions that when executed cause the system to compute the first stage image values in accordance with:

$$S_{stage\_1}(R_j, fd(R_j, n)) = \sum_{i=1}^{N_p} S_{mocomp}(i, R_j) \cdot \exp(j2\pi \cdot fd(R_j, n) \cdot i')$$

where $i'=[-N_p/2, \ldots, -1, 0, 2, \ldots N_p/2-1]$, $fd(R_j,n)$ is Doppler frequency at $(R_j,n)$, $R_j = \|\bar{x}_{ac}(i_c) - (\bar{x}_b + n \cdot \hat{p}_{az} + \beta \cdot \hat{p}_{rg})\|$, $\bar{x}_b$ is position of each image block center, $\bar{x}_{ac}(i)$ is position of the SAR aircraft at the i-th pulse in the pulse group, $\hat{p}_{az}$ is azimuth unit vector of the image grid, $\hat{p}_{rg}$ is range unit vector of the image grid, n is azimuth coordinate index, $i_c = N_p/2+1$, $N_p$ is number of pulses in a processing pulse group, where $\alpha$ is along-track pixel index n and $\beta$ is cross-track pixel index associated with the pixel having a slant range of $R_j$.

15. The system of claim 14, wherein the memory includes executable code representing instructions that when executed cause the system to compute the second stage image values in accordance with:

$$S_{stage\_2}(m, n) = \sum_{k=1}^{K} S_{stage\_1}(R_j, n) \cdot w_k(R_j, m)$$

where $R(m,n)$ is distance between grid point $(m,n)$ and $\bar{x}_{ac}(i_c)$, and $w_k(R_j,m)$ are the interpolation coeffiicents determined based on the range of the point $(m,n)$ and $R_j$.

16. The system of claim 15, wherein the full-resolution SAR image is generated in accordance with:

$$S_{F\_res}(m, n) = \sum_{l=1}^{L} S(m, n, l) \cdot \exp\left\{-j4\pi \frac{R_{i_c(l),m,n}}{\lambda}\right\},$$

where $R_{i_c(l),m,n} = \|\bar{x}_{ac}(i_c(l)) - \bar{x}_{m,n}\|$, $i_c(l)$ is pulse index of the center pulse in group l, $\bar{x}_{ac}(i_c(l))$ is the aircraft position at the center of each pulse group, and $R_{i_c(l),m,n}$ is the distance between $\bar{x}_{ac}(i_c(l))$ and the image pixel $(m,n)$.

* * * * *